United States Patent [19]

Cizaire

[11] Patent Number: 4,735,248
[45] Date of Patent: Apr. 5, 1988

[54] DETACHABLE TIRE ANTI-SKID DEVICE

[76] Inventor: Ivan Cizaire, Chemin du Mourion Haut, 30400 Villeneuve-les-Avignon, France

[21] Appl. No.: 886,469

[22] Filed: Jul. 17, 1986

[30] Foreign Application Priority Data

Jul. 18, 1985 [FR] France ................. 85 11145

[51] Int. Cl.$^4$ .................. B60C 27/12; B60C 27/20
[52] U.S. Cl. ..................... 152/213 A; 152/218; 152/225 C; 152/429
[58] Field of Search ........... 152/213 R, 213 A, 225 R, 152/225 C, 208, 217, 218, 226–230, 415, 427, 429; 81/15, 8; 141/38, 4, 98, 385; 91/536; 254/228

[56] References Cited

U.S. PATENT DOCUMENTS 4,603,916 8/1986 Granryd ............... 152/213 A

FOREIGN PATENT DOCUMENTS 2464835 3/1981 France .

Primary Examiner—Jerome Massie
Assistant Examiner—Thomas Bokan
Attorney, Agent, or Firm—Sughrue, Mion, Zinn, Macpeak & Seas

[57] ABSTRACT

A detachable anti-skid device for a vehicle wheel tire comprises a support bearing a series of anti-skid components extending transversely over the tread of the tire and at least one pneumatic jack fed from the air valve of the tire and making it possible to apply the anti-skid components against the tire. The support is formed by a ring having a diameter which is slightly less than that of the tire and on which the anti-skid components are pivotally mounted. The ring also comprises a hub with a compressed-air distribution chamber connected by a rotary connection to the inlet valve of the tire and to the control jacks of the anti-skid components.

5 Claims, 1 Drawing Sheet

DETACHABLE TIRE ANTI-SKID DEVICE

The present invention relates to a detachable anti-skid device, intended to be fitted to the tire of a wheel of a vehicle and of the kind comprising a support bearing a series of anti-skid components extending transversely over the tread of the tire and at least one pneumatic jack provided with means for its supply from the air valve of the tire and which makes it possible to apply the anti-skid components against the tread of the tire.

BACKGROUND OF THE INVENTION

Such devices are known and are, for example described in French Patent No. F-A 2 464 835. In the device described in this patent, the support is formed by several pairs of radiating rods (FIG. 8) each of which bears an anti-skid component at its outer end. The inner ends of the rods of each pair are connected to linking parts or flanges which connect them simultaneously to two jacks of a set of jacks disposed for example in a triangle. These jacks are actuated by the compressed air of the tire and are connected to the air valve of the tire by a flexible hose.

Such a device has two major drawbacks which have prevented its usd in practice. Firstly, the assembly of the components of this device does not form a rigid structure and its positioning on the tire of the vehicle without dismantling is long-drawn and arduous and necessitates more often than not the intervention of two persons. The regular positioning of the radiating rods proves, in practice, to be very difficult, if not impossible. Secondly, the anti-skid components have a tendency, upon the movement of the vehicle, to slip on the tread of the tire. This gives rise to a distrubance of the regular structure of the device and very often in the rupture of the flexible hose connecting the jacks to the air valve of the tire and thus in a complete detachment of the device.

SUMMARY OF THE INVENTION

The object of the invention is to provide a device of the said kind making it possible to obviate the said two drawbacks of the known devices.

In the device in accordance with the present invention, the said support is formed by a ring the diameter of which is slightly less than that of the tire and on which the anti-skid components are pivotally mounted, the ring comprising a hub held in position by a series of spokes and which comprises a compressed-air distribution chamber the inlet orifice of which is connected by a rotary connection and by a flexible hose to the inlet valve of the tire whilst the outlet orifices are connected to the control jacks of the anti-skid components which are disposed between the said hub and the anti-skid components.

In this way, a rigid structure is obtained in which the anti-skid components are held perfectly in their relative positions in the course of the movement of the vehicle. Such a device can be positioned on the wheel in a simple and rapid manner by a single person and without movement of the vehicle. Thanks to the rotary connection, one no longer runs the risk of the wrenching off the connection hose from the air valve of the tire upon a slippange of the anti-skid components on the latter.

In accordance with a preferred embodiment of the device according to the invention, the device comprises, for each anti-skid component, an individual control jack extending radially between the hub and the corresponding anti-skid component.

Such a structure is particularly simple and comprises a very small number of moving parts which are susceptible to the bad weather to which a device of this kind is exposed upon its use in winter.

In accordance with one embodiment of the invention, the jacks exert a traction on the anti-skid components in order to apply them to the tread of the tire.

In accordance with a second embodiment of the invention, the jacks exert a pressure on the anti-skid components in order to apply them to the tread of the tire.

In accordance with a particularly simple and advantageous embodiment of the device according to the invention, the said ring is formed by a tubular component and the anti-skid components have a tubular portion engaged directly over the said ring, means being provided to prevent any sliding of the anti-skid components relative to the said ring.

BRIEF DESCRIPTION OF THE DRAWINGS

Other features and advantages of the invention will become apparent from the following description given by way of example and with reference to the accompanying drawings, in which.

DESCRIPTION OF PREFERRED EMBODIMENTS

Figure 1:
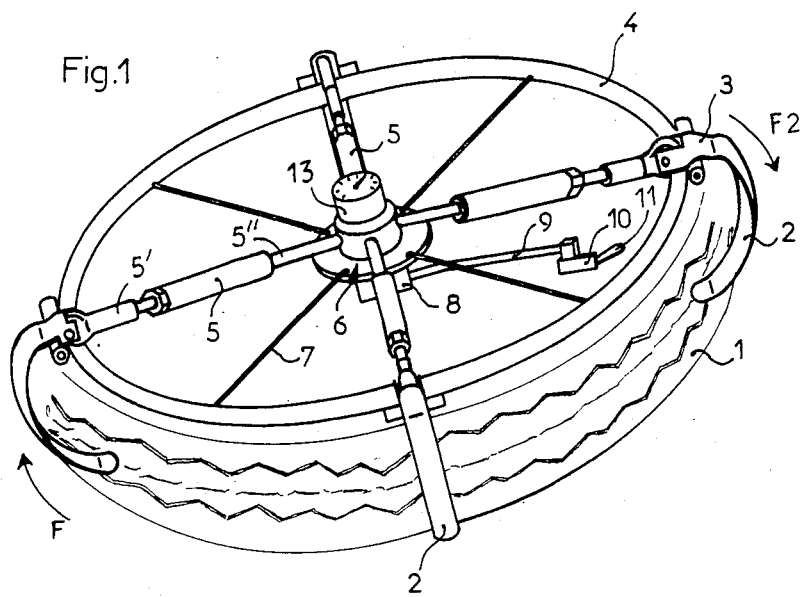
FIG. 1 is a perspective view of one preferred embodiment of the device according to the invention.

Referring to FIG. 1 there can be seen a tire 1 of a wheel of a vehicle equipped with a device according to the invention. This device comprises four anti-skid components 2 intended to be applied in the service or working position transversely on the tread of the tire 1. These four anti-skid components are evenly spaced around the circumference of the tire 1 and each component 2 is formed by a curved part the inner surface of which closely matches the tread of the tire 1 and comprises hooking means. One of the ends of each anti-skid component 2 is connected by a joint 3 to a support ring 4, the diameter of which is slightly less than that of the wheel to be fitted out. In this way, the components 2 can be pivoted about an axis tangential to the support ring between a rest position in which they are disengaged from the tire 1 and a service position in which they are applied over and secured on the tread of the tire 1. This pivoting of each component 2 between its rest position and its service position is controlled by a pneumatic jack 5 disposed radially between the inner end of each component 2 and a central distributor hub 6 which is also connected to the ring 4 by fixed spokes 7. The rod of each jack 5 is connected by a joint 5' to the inner end of the corresponding anti-skid component whilst the cylinder of each jack 5 is connected by a shaft 5" to the central hub 6. The hub 6 is hollow and forms a pneumatic distribution chamber (not shown here), the compressed-air inlet orifice of which is connected by a rotary connection 8 to a flexible hose 9, the other end of which bears a connection intended to be engaged in a detachable manner over the air valve 11 of the tire 1. The compressed-air inlet orifice of each jack 5 is connected by the shaft 5" to a compressed-air outlet orifice of the distribution chamber formed by the hub 6. In the embodiment shown here, the hub 6 bears a pressuregauge 13 indicating the air pressure in the distribution chamber formed by the hub 6.

At rest, the rods of the jacks 5 are retracted and the anti-skid components 2 are pivoted in the direction of the arrow F into their rest position. The device according to the invention can then be engaged in a lateral direction over the wheel of a vehicle. This operation is simple and can be effected by a single person without movement of the vehicle. When the device is positioned on the wheel, the connection 10 is connected up with the air valve 11 of the tire 1. The compressed air then flows through the flexible hose 9, the rotary connection 8, the distribution chamber formed by the hub 6 and the shaft 5" into the cylinder of each jack 5. The rod of each jack 5 is pushed radially outwards and causes the corresponding anti-skid component 2 to pivot in the direction of the arrow F2 into its service position in which it is tightly applied to the tread of the tire 1 and holds the device in position on the wheel of the vehicle.

Figure 2:
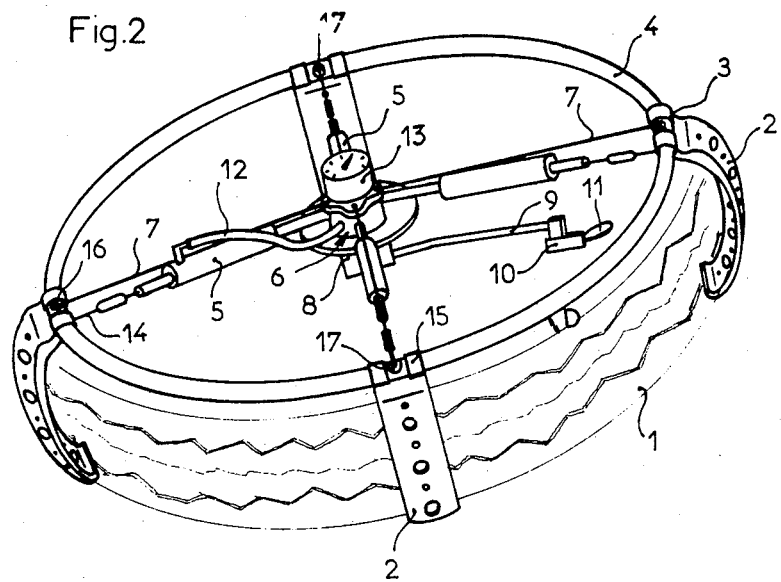
FIG. 2 is a similar perspective view of a second preferred embodiment.

The embodiment shown in FIG. 2 is very similar to that shown in FIG. 1. The device according to the invention shown in this Figure again comprises four anti-skid components 2 mounted pivotally on a ring 4 and the pivoting of which is controlled by a pneumatic jack 5 extending radially between each component 2 and a central hub 6 held in position by spokes 7. This hub 6 is again hollow and forms an air distribution chamber the air inlet orifice of which is connected through a rotary connection 8 to a flexible hose 9, the opposite end of which bears a connection 10 intended to be engaged over the air valve 11 of the tire of the wheel of a vehicle. The jacks 5 are fed with compressed air through flexible hoses 12 connected to the distribution chamber formed by the hollow hub 6. However, in this embodiment, the jacks 5 work by traction. To this end, the free end of the rod of each jack 5 is connected by a cable 14, preferably of the headed type, to the corresponding component 2. Each anti-skid component 2 comprises at its inner end a tubular portion 15 engaged directly over the ring 4 in order to allow a pivoting of the component about the ring 4. These components 2 are held in position on the ring 4 by positioning fingers 16 engaged into elongate slots 17 provided in the tubular portions of the components 2. This structure is simpler and less costly than that shown in FIG. 1.

It will be noted in particular that the spokes 7 connecting the hub 6 to the ring 4 are preferably disposed at the position of the jacks 5 in order to facilitate the manipulation of the device according to the invention. In the accompanying drawings, the spokes have been shown in offset positions for the sake of clarity of the views.

The anti-skid components are made of a particularly hard and resistant material and more especially of hardened steel whilst the ring 4 and the hub 6 may be made of light alloy such as an aluminium alloy or even of plastics material in order to lighten the device according to the invention.

Of course, the invention is not limited to the embodiments described and shown but numerous modifications may be made thereto without departing from the scope of the invention.

What is claimed is:

1. In a detachable anti-skid device for fitting to the tire of a wheel of a vehicle and of the kind comprising a support bearing a series of anti-skid components extending transversely over the tread of the tire and at least one pneumatic control jack provided with means for feeding air to said jack from the air valve of the tire for applying the anti-skid components against the tread of the tire, the improvement wherein said support is in the form of a ring the diameter of which is slightly less than that of the tire, means for pivotally mounting one end of said anti-skid components on said ring for pivoting about a pivot axis tangential to said ring, a hub for the ring held in position by a series of spokes extending between said hub and said ring, said hub comprising a compressed-air distribution chamber, an inlet orifice to said chamber, a rotary connection and on said hub a flexible hose coupled to said rotary connection for coupling to the inlet valve of the tire, and outlet orifices from said chamber connected to the pneumatic control jacks of the anti-skid components with said pneumatic control jacks disposed radially between the said hub and the anti-skid components and operatively coupled at opposite ends to said anti-skid components and said hub, respectively.

2. A device according to claim 1, wherein, for each anti-skid component, an individual control jack extends radially between the hub and the corresponding anti-skid component.

3. A device according to claim 2, wherein the jacks comprise means for exerting a traction on the anti-skid components in order to pivot them to apply them to the tread of the tire.

4. A device according to claim 2, wherein the jacks comprise means for exerting a pressure on the anti-skid components in order to pivot them to to apply them to the tread of the tire.

5. A device according to claim 1, wherein said ring is a tubular component and the anti-skid components have a tubular portion engaged directly about said ring, and means are provided to prevent sliding of the anti-skid components on the said ring.

* * * * *